United States Patent
Cheney et al.

[11] Patent Number: 5,917,840
[45] Date of Patent: Jun. 29, 1999

[54] PROTECTION AGAINST COMMUNICATIONS CROSSTALK IN A FACTORY PROCESS CONTROL SYSTEM

[75] Inventors: M. Charles Cheney, Wrentham; Simon Korowitz, Sharon; William M. Slechta, North Attleboro; Nathan H. Tobol, Wrentham, all of Mass.

[73] Assignee: Foxboro Company, Foxboro, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 07/851,977

[22] Filed: Mar. 13, 1992

[51] Int. Cl.$^6$ ............................ G06F 11/10; H03M 13/00
[52] U.S. Cl. ............................................. 371/53; 371/37.7
[58] Field of Search .................................. 371/37.7, 53, 48, 371/37.1, 32, 33, 15.1, 20.1, 30, 68.2; 340/825.07; 370/13; 375/10; 395/575

[56] References Cited

U.S. PATENT DOCUMENTS

| | | | |
|---|---|---|---|
| 4,385,384 | 5/1983 | Rosbury et al. | 371/22 |
| 4,751,510 | 6/1988 | de Saint et al. | 340/825.07 |
| 4,947,484 | 8/1990 | Twitty et al. | 371/37.1 |
| 5,007,054 | 4/1991 | Lee et al. | 371/32 |
| 5,084,871 | 1/1992 | Carn et al. | 370/94.1 |
| 5,191,610 | 3/1993 | Hill et al. | 380/21 |

*Primary Examiner*—Phung M. Chung
*Attorney, Agent, or Firm*—Fish & Richardson P.C.

[57] ABSTRACT

A method for transmitting messages between a communications controller and devices in a factory process control system, wherein each device has an associated identification number which is unique to that device. A message to be transmitted is compiled, and then based on the criticality of the message, one of a standard, secure, or critical message protocols is chosen for the message; each protocol being defined to generate a message checksum for the message in a manner different from the other protocols. The generated checksum is then included in the message. Using the secure and critical protocols, a message checksum is generated from the message to be transmitted and the identification number of the intended recipient device. In the secure protocol, the message checksum is included in the message, but the identification number is not included in the message; in the critical protocol, both the message checksum and the identification number are included in the message. A crosstalk query message may be sent from the controller to determine if a link of a factory process control system is susceptible to crosstalk. The controller sends to a link on which a particular device is known to reside a diagnostic message indicating the identification number of the particular device and requesting any other devices that unintentionally receive the message to transmit a response message to the communications controller.

16 Claims, 8 Drawing Sheets

Microfiche Appendix Included
(2 Microfiche, 136 Pages)

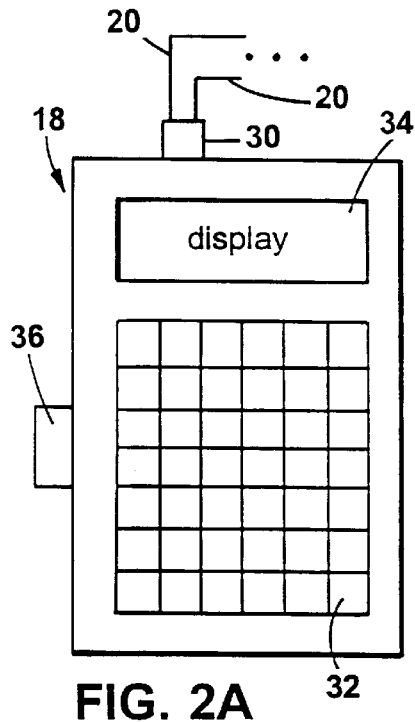
FIG. 2A
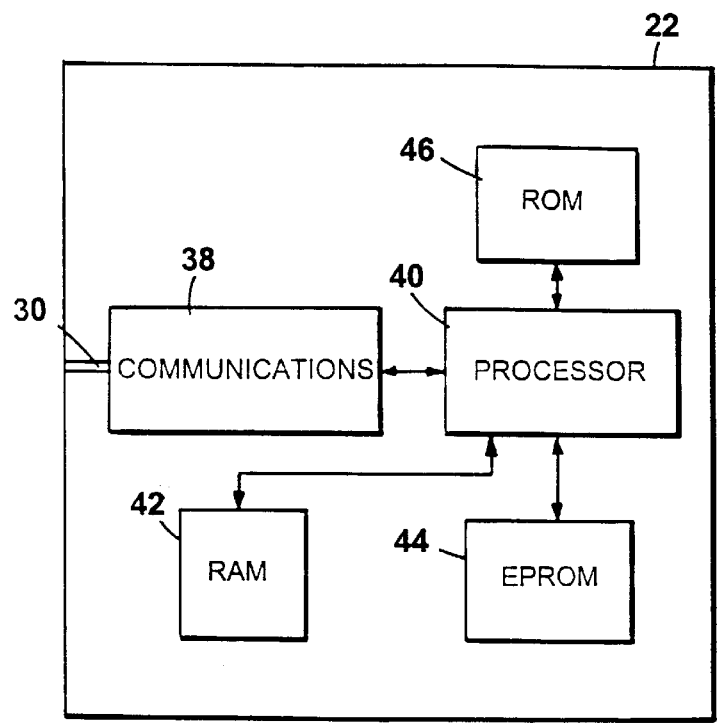
FIG. 2B
| CHANNEL 28 | DEVICE NAME 33 | ID NUMBER 35 | CRC VALVE 37 | NO SECURITY FLAG 39 |
|---|---|---|---|---|
| 1 | VALVE 1 | 1011...101 | 10..1101 | 1 |
| 2 | VALVE 2 SENSOR 1 | | | |
| 3 ⋮ n | | | | |
FIG. 3

| IDENTIFIER | PROTOCOL VARIENTS | | | | | |
| --- | --- | --- | --- | --- | --- | --- |
| | STANDARD | | SECURE | | CRITICAL | |
| | COMM. | RESP. | COMM. | RESP. | COMM. | RESP. |
| F | ∅ | 8 | 2 | A | — | — |
| 5 | 3 | B | — | — | 6 | E |
| ⋮ | | | | | | |

PROTECTION AGAINST COMMUNICATIONS CROSSTALK IN A FACTORY PROCESS CONTROL SYSTEM

REFERENCE TO MICROFICHE APPENDIX

A microfiche appendix containing 2 microfiche accompanies this patent application pursuant to 37 C.F.R. §1.96(b) and is designated as Appendix A. The first microfiche contains 98 frames and the second microfiche contains 38 frames.

BACKGROUND OF THE INVENTION

This invention relates to factory process control systems, and more particularly, to communications protocol schemes for securing the integrity of messages passed in a process control system against crosstalk in the system.

Factory processing operations often utilize a control system of distributed sensors and actuators to monitor and control operations like food or materials processing. Sensors might monitor, for example, the pressure and temperature of processed materials, while actuators might control the opening of valves and the regulation of heat. A factory processing operation may rely on hundreds, or even thousands, of such sensors and actuators, distributed throughout the factory process site, (which may be many miles wide) for successful integration of process control.

Each of the control system's distributed sensors and actuators is typically connected to a central control station in the factory by means of a transmitter connected to an electrical link. Together with links from other sensors and actuators, as well as links to autonomous processing equipment not in the control system, the link is strung through the factory to the central controller. The central controller communicates with the sensor and actuator transmitters across the links to command their operations and monitor their status. For example, the closure of a valve in an emergency situation would be commanded by the controller across the system link and to the transmitter corresponding to the valve actuator.

Commonly, the bundle of transmitter links strung through the factory is susceptible to electrical signal crosstalk between the links and also to external sources of electrical noise from, for example, the autonomous processing equipment. In addition, links which share common impedances (such as a common fuse) are even more susceptible to internal crosstalk. This internal crosstalk and external noise can distort valid command and response messages sent between the central controller and the sensors and actuators, and may even introduce false messages into the system. Thus, direct hardware links between the controller and the transmitters do not ensure that controller commands are received and acted on only by an intended sensor or actuator, and do not ensure that reply messages to the controller originated at an expected transmitter.

Conventional addressing schemes, in which each sensor and actuator is assigned a unique address, are also ineffective at securing the integrity of command and reply messages in the control system. In a typical factory process installation, there is no predefined upper limit on the number of sensors and actuators that could be added to the system; as the process changes over time, the control system correspondingly changes in an unpredictable way. Thus, in an address-based scheme in which a destination address field would be included in each message, the address field would have to be arbitrarily wide to accommodate an unpredictably large number of unique addresses for all possible future transmitters. Also, the length of a message and correspondingly, the message transmission time and the control system throughput would be severely impacted by such an address field requirement.

SUMMARY OF THE INVENTION

In general, in one aspect, the invention provides a method for indicating the intended recipient device of a command message transmitted by a communications controller in a factory process control system to the device. Such a control system includes many devices linked together and to the communications controller for command by the controller, and each device is adapted for a sensing or actuating function related to the factory process. Each device in the system has an associated identification number which is unique to the device. In the invention, a command checksum is generated from the command message to be transmitted and the identification number of the intended recipient device, and the command checksum is included in the message, but the identification number is not included in the message; the compiled message is then transmitted from the controller.

After receipt of the command message at one of the system devices, a second command checksum is generated from the received message and the identification number of the receiving device, and the second command checksum is compared with the command checksum transmitted with the message. The command message is then accepted by the receiving device only if the command checksum matches the second command checksum.

Using this scheme, the invention provides a high degree of security for ensuring that only the intended device accepts a command message, and yet does not require any additional message length for including an indication of the intended device. This minimizes message transmission time and optimizes the overall throughput of the factory process control system.

In preferred embodiments, the invention includes transmitting a reply message from the recipient device to the communications controller. The device accomplishes this by the compiling a reply message, generating a reply checksum from the reply message and the identification number of the recipient device, and including the reply checksum in the message, but not including the identification number in the message, and transmitting the message.

In further preferred embodiments, before the command checksum is generated, an ID checksum is generated from the identification number of the intended recipient device and is used as an initialization value for the command checksum. And after receipt of the command message at one of the devices, a recipient ID checksum is generated from the identification number of the receiving device, and is used as an initialization value for the second command checksum. The ID checksum, command checksum, recipient ID checksum, and second command checksum all comprise cyclic redundancy codes.

In more preferred embodiments, the invention includes first sending a query message from the communications controller to the intended recipient device requesting the device to transmit a message indicating the identification number of the device for subsequent use by the controller in generating the ID checksum. The intended recipient device then transmits a message to the controller indicating its identification number, and the device generates a recipient ID checksum from the identification number and stores the checksum for subsequent use in generating the second command checksum.

In a more preferred embodiment, the invention includes determining if the command message comprises a critical command before transmitting the message from the controller, and including in the message the identification number for the intended device if the command does comprise a critical command; for example a reinitialize command.

In general, in another aspect, the invention provides a method for determining if a link of the factory process control system is susceptible to crosstalk. In the invention, a diagnostic message is sent from the communications controller to a link on which a particular device is known to reside in the system. This message indicates the identification number of the particular device and requests any other devices unintentionally receiving the message to transmit a response message back to the communications controller.

This diagnostic scheme allows an operator to quickly determine if one or more links of the control system are crosstalking, and thereby delivering to devices on the links commands intended for other devices. Using this query scheme, such links may be positively identified for diagnostic work.

In more preferred embodiments of the invention, the particular device specified in the diagnostic query message does not transmit a response message to the controller. The invention further includes first linking the particular device to the factory process control system before sending the diagnostic message.

In general, in another aspect, the invention provides a method for transmitting messages between the communications controller and devices in the factory process control system. In the invention, a message to be transmitted is compiled, and then based on the criticality of the message, one of a plurality of available message protocols is invoked. Each protocol is defined to generate a message checksum for the message in a manner different from the other protocols. The generated checksum is included in the message, and the message is transmitted.

With this flexible scheme, the invention allows system users to select protocols for transmitting messages based on the criticality of the messages. In this way, the overall throughput of the system is optimized by not requiring the same processing of each message transmitted in the system.

In preferred embodiments, the plurality of message protocols comprises a standard protocol for use with noncritical messages and defined to generate a message checksum from the message, and a secure protocol for use with more critical messages and defined to generate a message checksum from the message and the identification number of a device for which the message is intended. In more preferred embodiments, the plurality of message protocols further comprises a critical protocol for use with most critical messages and defined to generate a message checksum from the message and the identification number of a device for which the message is intended; the identification number is included in the message if the critical protocol is invoked.

Features and advantages of the invention other than those given above will become apparent from the following detailed description and from the claims.

DETAILED DESCRIPTION

We first briefly describe the drawings.

FIG. 2A is a sketch of a typical field portable controller shown in FIG. 1A.

FIG. 2B is a block diagram of the electronics in the controller of FIG. 2A.

FIG. 3 is a chart showing the data contained in a device name table stored in a field bus module of FIG. 1B.

Factory Control System

Figure 1A:
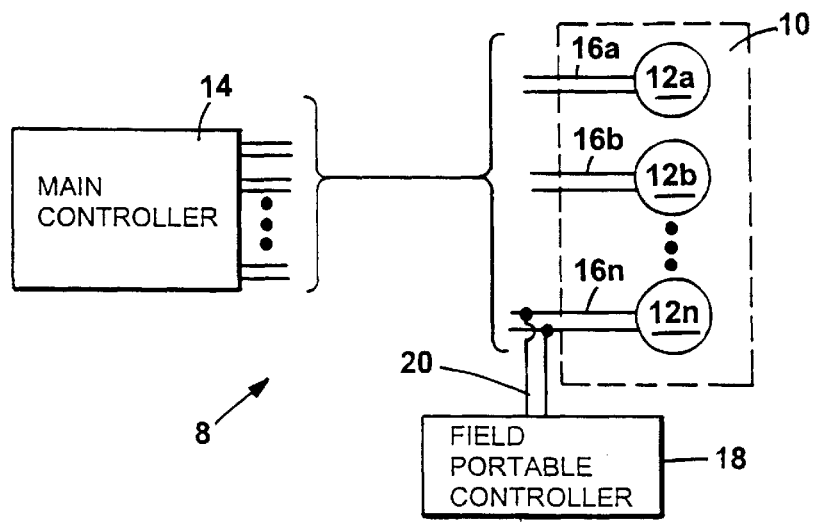
FIG. 1A is a diagram illustrating a typical factory control system in which the invention may be used.

Referring to FIG. 1A, a factory process control system 8 includes numerous sensor and actuator devices 12a–12n (collectively 10) which interface to various controlled components, such as pressure valves, and which monitor process parameters, such as temperature. Each sensor and actuator has an associated transmitter (not shown) which provides for communication of process information between the sensor or actuator and a main controller 14. The term "transmitter" will be used throughout the following description to refer to the combination of a sensor or actuator and its corresponding communications interface. The term "controller" will be used throughout the following description to refer to a communications control unit which controls communication to and from the system transmitters; as such, the controller may also control process operations, but at the least controls transmitter commands.

The control system transmitters are distributed throughout a factory operation site at, for example, processing stations, and are each linked to the main controller 14 by a corresponding connecting link 16a–16n which forms a closed current loop with the controller. At the site of the main controller, supervisory monitoring and control equipment and various measurement instrumentation and data processing equipment may be hooked into each transmitter current loop.

The transmitter connection links 16 may comprise copper wire, optical fiber, or any suitable connection media; preferably they comprise twisted pair connections. In one control scheme, each transmitter is activated based on the current level in its current loop link, and each transmitter in turn adjusts the current level based on its status. For example, given a current range of 4–20 mA, a current level of 10 mA might trigger the opening of a valve, and a current level of 4 mA might indicate that the valve has been closed. This entirely analog control system also provides power to the transmitter via the current links.

The control system transmitters 12a–12n may also be controlled using a digital control scheme in a decentralized manner, using a field portable controller 18 which is clipped across a transmitter's current link 16 via a connecting link 20 at a point in the factory at which the transmitter link is accessible, e.g., a wall bracket connector. For clarity, throughout the following discussion the digital controller will be referred to as the field portable controller, but it comprises communications control capabilities as defined above in connection with the main controller. In this scheme, many such portable controllers may be maintained locally by many factory operators. Because a factory operation may be miles long, such local control by operators each at their own processing station provides greatly enhanced operational efficiency.

In this digital control scheme, each transmitter link 16 provides power to the transmitter from the main controller, just as in the all-analog control scheme. Here however, transmitter commands may be keyed in to the portable controller, which digitally encodes the commands and superimposes a corresponding signal over the analog current level in the transmitter link 16. The commands are digitized based on a frequency shift keying (FSK) scheme, in which "1s" and "0s" are indicated by the frequency of the signal. This scheme allows a digital representation signal to be carried on the same link as the analog current signal without interfering with that signal, because the analog current signal changes much more slowly than the FSK signal. If a particular transmitter in the system is configured to operate using the analog control scheme and the digital control scheme, it is controllable by a field controller using an FSK system of 3125 Hz corresponding to a "0" and 5208 Hz corresponding to a "1". If a particular transmitter in the system is configured to operate only using the digital control scheme, a field controller then uses an FSK system of 6250 Hz corresponding to a "0" and 10,417 Hz corresponding to a "1".

Figure 1B:
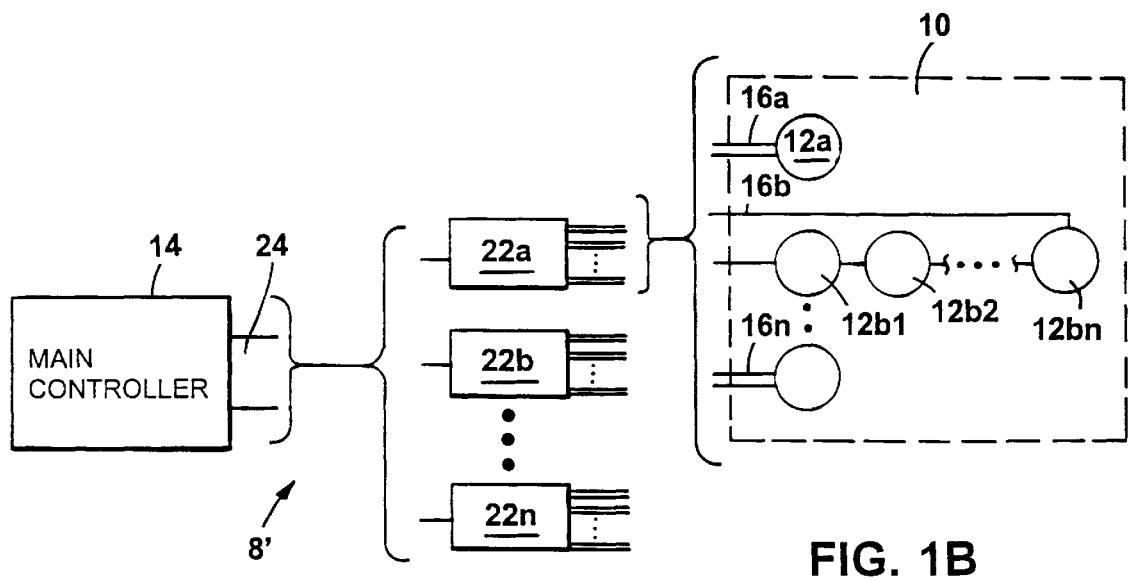
FIG. 1B is a diagram illustrating a second factory control system in which the invention may be used.

Referring also to FIG. 1B, in a second process control system scheme 8', the main controller 14 is connected to a number of field bus modules 22a–22n via a digital field bus 24. For clarity, throughout the following discussion these modules will be referred to as field bus modules, but they comprise communications control capabilities as defined above in connection with the main controller and the field portable controller. Each field bus module is connected to a number of the transmitters 12 via current loops 16 like that in FIG. 1A. Preferably up to eight transmitters loops are connected to each field bus module; the configuration of the module determines the number of transmitter loops it can support.

In this second process control system scheme, each of the eight transmitter loops may support more than one transmitter, thereby providing a multidrop loop. For example, as shown in FIG. 1B, a loop 16b may be connected to each of a set of transmitters 12b1, 12b2, . . . , 12bn, in series with a corresponding field bus module. Preferably up to three transmitters are connected on one multidrop loop. In this configuration, the current loop 16b provides power to each of the transmitters, but does not control the transmitters in the analog scheme described above. A transmitter may rely on the analog control scheme alone only if it is connected to a field bus module as a single transmitter on one current loop.

Alternatively, a single transmitter on one current loop, like those transmitters on a multidrop loop, may also be controlled in a completely digital mode. In this configuration, a field bus module communicates with each of the transmitters 10 times per second, and can simultaneously communicate with all of the transmitters connected to it. This communication is digitally encoded in the FSK scheme described above overlaying the analog current level in the loops. Control from the main controller 14 to each field bus module is entirely digitally encoded in a programming environment suitable for the field bus configuration.

Each of the two process control system schemes has its own advantages; the field portable controller scheme provides decentralization of transmitter control and operator adaptability, while the field bus module scheme provides simplified interconnections, automation of process parameter monitoring, and centralization of software configuration. Also, the field bus module configuration is flexible in that a field portable controller may also be connected to a transmitter link for commanding the transmitter, and in some scenarios, as described below, the field bus module relies on a portable controller for communication to a transmitter. The field bus module multidrop scheme reduces wiring costs (which may be quite substantial) by not requiring one current loop link for each transmitter, and thereby can reduce the number of field bus modules in the control system; the field bus modules, being compatible with the all analog control scheme are also quite flexible.

Referring to FIG. 2A, showing the field portable controller 18 in more detail, the controller 18 communicates with a transmitter via a connecting link 20 (as shown in FIG. 1) which interfaces with the controller via a connector 30. An operator keys in commands for a connected transmitter to a keyboard 32; those commands are displayed on a display 34 and communicated to the transmitter over the connecting link. A programming port 36 provides interface capabilities for installing programming modules which initiate or modify the command programming capabilities of the portable controller.

Communications between a transmitter and the portable controller are governed by communications circuitry 38, as shown in FIG. 2B, which interfaces to the connecting link connector 30. A processor 40 coordinates data transfer and storage in a random access memory (RAM) 42 and an erasable programmable read-only-memory (EPROM) 44 in response to controller-transmitter command-response sequences and data retrieval. A read-only-memory (ROM) 46 stores command sequences and other calibration information that is programmed in the controller via programming modules, which can be connected at the programming port 36.

Field bus modules contain all of the functional electronics contained in a field portable controller, and additionally include a second level of communications circuitry for communicating with the main controller across the digital field bus. Transmitters include hardware similar to that of the controllers for storing various commands and responses and for processing data that is collected during monitoring operations.

Transmitter Identification Scheme

Each transmitter linked into the control system has an associated identification code which is unique to that transmitter. This code represents an identification number (ID), but could represent other identifiers, e.g., an identification name or location. The ID is assigned to a transmitter at the time of its manufacture. Once assigned, the ID is stored in the transmitter for future reference, as described below.

The ID represents three numbers: the transmitter serial number, the date the device was manufactured, and the type of device, e.g., pressure sensor. Together, these three pieces of information are encoded to comprise a five byte-long binary number which is stored in EEPROM in the transmitter at the time of manufacture. No additional ID assignment procedure is then required if the transmitter is only later introduced to the control system. Once an ID has been assigned to a transmitter and that transmitter is linked in the system, the ID cannot be modified or deleted.

An additional identification scheme is used in the control system to provide a user-recognizable transmitter identifier; in this scheme, an operator may assign a tag number or device name to a transmitter when it is commissioned into the system. Such a commissioning procedure might typically consist of calibrating the transmitter for its intended sensing functions, assigning a tag number or device name, and initializing its data collection and storage functions. If the transmitter will be controlled by a field bus module, the transmitter is given a device name; a tag number is given to the transmitter if it will be controlled by a field portable controller. A tag number or device name may be used by the operator to easily characterize transmitters by, e.g., their functional description, such as "valve transmitter 5" or "VT1", or the transmitter's geographic location, such as "southern plant" or "MASS 5". This additional scheme does not necessarily require each number or name to be unique, but for reasons discussed below, it is preferable that each transmitter in the control system have both a unique ID and a unique tag number or device name.

A tag number is assigned to a transmitter when it is commissioned into a system that is configured to use field portable controllers by storing the number in the transmitter EEPROM as a twelve byte-long ASCII string. A field portable controller is connected across the transmitter current loop and the tag number is keyed into the controller with an appropriate command. Similarly, a device name may be assigned to a transmitter commissioned into a system configured to use field bus modules by storing the name in the transmitter EEPROM as a six byte-long ASCII string. Here a field portable controller is also connected across the transmitter current loop and the device name is keyed into the controller. If the loop is a multidrop link, each transmitter to reside on the link must be hooked up and named one at a time. It would be impossible to uniquely identify and name more than one "new" and unnamed transmitter on a multidrop link.

Because the device names and tag numbers are operator-specified, and may be changed at any time, there is no system level guarantee that the descriptors are unique; in fact, a transmitter may take on a default name or number which could be the same as every other default name if the operator does not assign a unique name or number—it is the operator's responsibility to verify this uniqueness. Thus, if an entire network of transmitters is commissioned at one time, it is preferable to first set up the network in a bench test configuration and to check that each transmitter is given a unique name or number, or to commission each transmitter onto the system one at a time, in each case verifying name or number uniqueness.

Control System Communications Protocol

Command-response message sequences between transmitters and both field controllers and field bus modules follow a communications protocol having three security levels to choose from: a standard protocol, a secure protocol, and a critical protocol. The standard protocol is used with simple commands, e.g., read data commands, that would be harmless if processed by the incorrect transmitter; the secure protocol is a variant for all standard protocol commands and is used in chosen instances to provide security against mistaken transmitter acceptance of misdirected commands, and when communicating to a transmitter on a multidrop link; and the critical protocol is used in critical command sequences to provide the highest level of security against misdirected commands that would change the operation of a transmitter. The security level of a particular command sequence is chosen based on the following considerations: the required degree of security for ensuring that only the intended transmitter acts on the commands, the hardware configuration of a particular transmitter (for example, multidrop), and the time allotted to a particular transmitter command transmission. Each of these considerations is discussed in detail below. Due to possible variability in the control system configuration and the integrity of the transmitter links, this security scheme prevents crosstalk and electrical interference from disrupting factory process control functions without impacting the throughput of the system.

Figure 4:
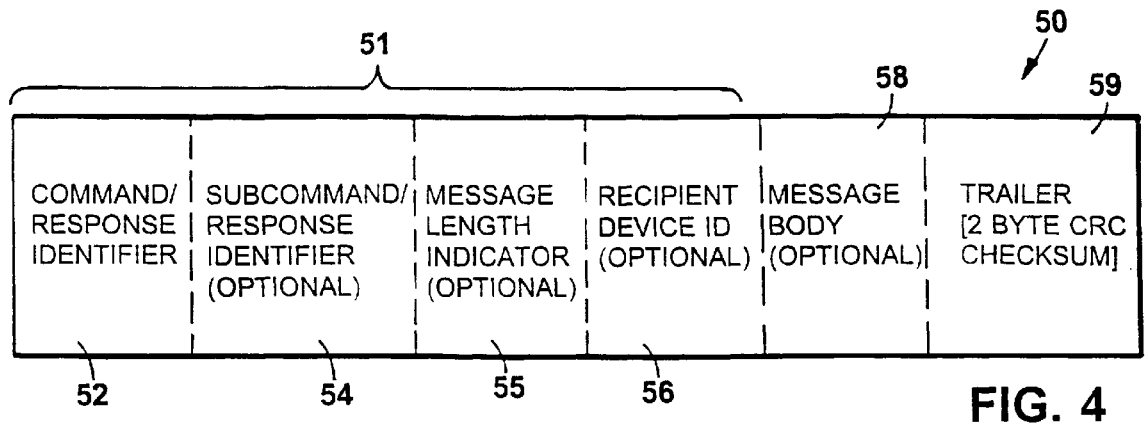
FIG. 4 is a chart showing the fields of a message which may be used in the invention.

The three communications protocol levels all support five basic types of transmitter commands which the controllers can invoke: read functions, write functions, change mode functions, perform task functions, and factory-specific operations. Each type of command elicits a corresponding response from the commanded transmitter. Referring to FIG. 4, any digitally encoded command or response message 50 sent to or from a transmitter consists of a header 51, a body 58, and a trailer 59. The header 51 includes a single-byte command or response identifier 52, which is a hexadecimal code corresponding to a command or response, and also includes an optional subcommand or response identifier 54 and an optional message length indicator 55. The header additionally includes an optional ID field 56; standard and secure protocol messages do not use this field, but critical protocol messages include the five byte-long ID of the intended transmitter to be commanded in this field, as described below. The optional body 58 of the message is used to transmit values of parameters that particular commands may update in the transmitter's memory. The trailer 59 of the message contains a two byte-long cyclic redundancy checksum for the message.

Figure 5A:
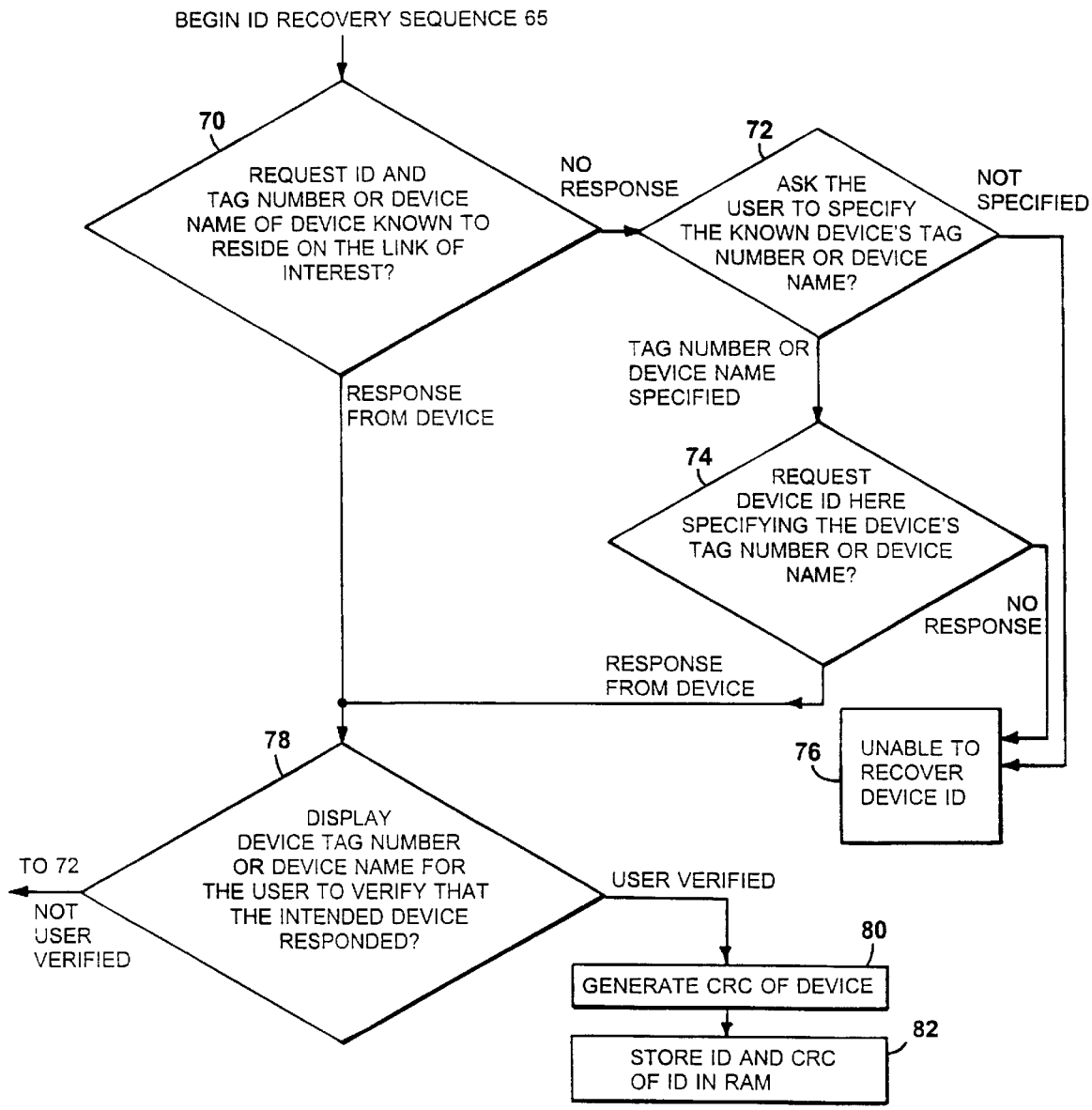
FIG. 5A is a flow chart illustrating the method of the invention for recovering the ID of a transmitter known to reside on a link of interest of a control system like that of FIG. 1.
Figures 5B, 9:
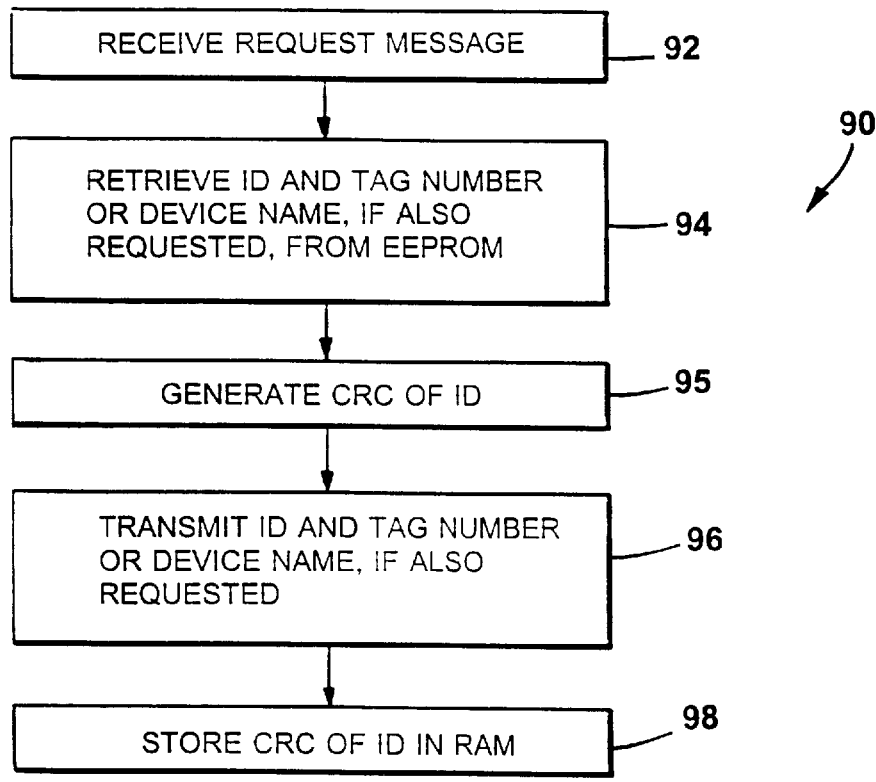
FIG. 5B is a flow chart illustrating the method of the invention for a transmitter to reply to the ID recovery method of FIG. 5A.
FIG. 9 is a chart showing the fields of an identifier table for use in the invention for compiling a command or response identifier based on the protocol variant of the command or response message.

The command or response identifier 52 included in each message header is selected based on the protocol level in which the message is being sent, and correspondingly, indicates the protocol level of a received message. Referring to FIG. 9, each controller, field bus module, and transmitter in the system includes a programmed identifier table 200 which specifies the correct identifier code for each possible protocol variant. A hex code identifier column 210 provides a base hex code for each command and response. This base code is correlated to a protocol variant in a the standard protocol column 214, a secure protocol column 216, or a critical protocol column 218. Then for a given protocol, a hex code is specified for standard commands, standard responses, secure commands, secure responses, critical commands, and critical responses; this code is added as a prefix to the base hex code to produce a full command or identifier code.

The protocol choice for a message is predefined based on the nature of the message and the configuration of the transmitter involved in the message communication. If a field portable controller or field bus module involved in the communication is able to determine the ID of an intended transmitter, in a process described below, then the secure and critical protocols are chosen over the standard protocol.

Further, if a particular command and response sequence is of a critical nature, the critical protocol is chosen over the secure protocol. If a transmitter's ID is unavailable to a controller, the standard protocol is used. Other protocol decision schemes could alternatively be supported by the system.

When sending a command, for example, a controller generates a hex command code from the identifier table based on protocol choice for the command. When receiving a command, a transmitter parses the command code based on the identifier table to determine the command and the protocol level of the command message. A more detailed description of this function is given below. The identifier table thereby provides a scheme for embedding a protocol level indication within a command code itself, requiring processing of only the actual command to determine the protocol of a received message. It further provides the ability to modify the protocol levels available for various commands and responses; the table could be updated based on changes in the factory process or changes in the criticality of various monitoring functions.

Each of the three different message protocols handles the message checksum, located in the trailer of each message, differently. However, in all cases, the checksum is generated by the controllers and the transmitters via software modules programmed in EPROM or EEPROM using a cyclic redundancy check (CRC) similar to the CCITT standard.

In any of the three protocol variants, the two byte-long CRC checksum is generated by first initializing all bits of the CRC bytes; if the standard protocol is used, the bits are initialized to zero, while if either of the other two protocols is used, the bits are initialized based on the ID of the transmitter in communication—this process is described below. Once the CRC bits are initialized, the most significant bit of the outgoing message is examined and the CRC bytes are left-shifted by one bit. The most significant message bit is then compared with the most significant bit of the CRC. If the values are equal, the CRC bytes are exclusive ORed with a generator polynomial, given as $x^{16}+x^{12}+x^5+x^0$. If the values are unequal, the CRC bytes are not modified. This process is completed for each bit of the outgoing message until the entire message is examined. The resulting bits in the CRC bytes are then appended to the end of the message as the trailer of the message as it is transmitted.

Standard Protocol—Lowest Level Security

When either a field bus module or a field portable controller sends a standard protocol message to a transmitter, the controller generates the CRC checksum characters for the command message following the procedure described above, and transmits the checksum characters in the message trailer. Then, when the transmitter receives the message, it generates the CRC for the received message and compares the result with the CRC bytes in the message trailer; unless the CRC values match, the message is disregarded and the command is not acted on.

Similarly, when a transmitter responds to a controller in the standard protocol, it generates CRC checksum characters for the response message as the response is transmitted, following the same procedure as the controllers, as discussed above, and then appends the CRC characters in the trailer of the response. Upon receipt of the response, a controller regenerates the message CRC, and like the transmitter, disregards the message if the regenerated CRC does not match that in the message trailer. Appendix A includes examples of standard protocol controller-transmitter command-response sequences; note that each includes the two-byte message CRC in its trailer.

Controller Recovery Of A Transmitter's ID

In order to carry out communication protocol levels other than the standard level, and diagnostic procedures supported by the system, all described below, the field portable controllers and field bus modules perform an ID recovery procedure for determining the ID information programmed in transmitters to be commanded. The two types of controllers handle this information differently, based on their hardware configurations.

Using a field portable controller, only one transmitter can be accessed at a given time; the controller is hardwired into a transmitter's current loop for accessing the transmitter, and then disengaged at the end of that access session for then accessing another transmitter. Accordingly, only one transmitter ID and tag number may be stored in a field portable controller at one time, that information being written over during a succeeding access session.

When a field portable controller has been connected to a transmitter and needs the transmitter's ID information for, e.g., commissioning the transmitter into the system, a multi-step command procedure is initiated to recover the ID. Referring to FIG. 5A, in this ID recovery process 65, the controller first requests 70 the ID and tag number of the transmitter of interest, perhaps along with other information such as transmitter status, using a command configured in the standard protocol, like the one following.

Read Device ID and Tag Number
REQUEST:
20 HEX (Standard protocol command byte corresponding to "read ID")
CRC Least Significant Byte
CRC Most Significant Byte Under normal circumstances, the transmitter would reply with the following response:

RESPONSE:
A0 HEX (Standard protocol reply byte corresponding to "read ID")
Status byte (Indicate status of transmitter)
Tag number (Indicate assigned tag number)
Device serial number (Part of ID number)
Device manufacture date (Part of ID number)
Device type (Part of ID number)
CRC Least Significant Byte
CRC Most Significant Byte If the Read Device ID command sequence is unable to communicate with the intended transmitter, due to crosstalk or signal garbling, for example, the portable controller presents 72 the operator with the option of specifying the intended transmitter's tag number, if known, in the ID command message and then retrying the command sequence; thereby narrowing down the number of transmitters that might act on the message (to theoretically one). If the operator chooses not to specify the tag number and the transmitter continues to be unreachable, the portable controller is left unable 76 to recover the transmitter ID; in this case, the controller cannot proceed with any diagnostics which rely on the number or communication protocol levels higher than the standard level.

Alternatively, if the operator does specify the tag number, the controller again requests 74 the intended transmitter to respond with its ID number, using a standard protocol command such as the following:

Read Device ID via Tag Number
REQUEST:
29 HEX (Standard protocol command byte corresponding to "read ID for this tag number")

Device tag number (specify tag number of interest)
CRC Least Significant Byte
CRC Most Significant Byte
If the command successfully reaches the intended transmitter, the following response would be provided:
RESPONSE:
A9 HEX (Standard protocol reply byte corresponding to "ID specified for a given tag number")
Status byte (Indicate status of transmitter)
Device serial number (Part of ID number)
Device manufacture date (Part of ID number)
Device type (Part of ID number)
CRC Least Significant Byte
CRC Most Significant Byte Inability of the field portable controller to communicate with the intended transmitter using either of these ID request commands disables 76 the controller from recovering the ID and indicates a system fault which must be investigated via, for example, hardware diagnostics.

If the transmitter has responded to either the original ID request or the modified request, the controller then displays 78 the transmitter tag number for the operator to verify that the intended transmitter has, indeed responded. Upon display 78 of the tag number or device name, if the operator does not verify the transmitter identity, the controller will again present 72 the operator with the option of specifying the correct tag number. Then, just as before, if the user does not opt for the specification, the controller is left unable 76 to recover the intended transmitter's ID, and cannot initiate diagnostic procedures.

If the operator verifies the displayed tag number, the controller then generates 80 the cyclic redundancy checksum for the ID number, using the standard protocol procedure outlined above, and stores 82 both the ID and the CRC of the ID in its RAM. As explained above, the field portable controller can maintain only one transmitter's ID information at a time; this procedure must be repeated when the controller has ended one transmitter session and is thereafter hooked up to another transmitter.

Referring to FIG. 5B, the intended transmitter follows a response procedure 90 when it receives the controller's ID request 92. First, the transmitter retrieves 94 its ID number and tag number, if requested, from its EEPROM, where that data was stored at manufacture and during commissioning. Its processor then generates 95 the cyclic redundancy checksum for its ID, following the standard protocol discussed above. As requested, the ID number and tag number are then transmitted 96 back to the controller, and finally, the generated ID number CRC is stored 98 in the transmitter's RAM for future reference. Thereafter, having received the transmitted ID number and tag number, the controller proceeds with any diagnostic procedures or higher level protocol, as described below.

Field bus modules follow a slightly different procedure for obtaining and storing transmitter ID information. As described earlier, a field bus module is hardwired to as many as eight current loops and 24 transmitters (assuming each loop to be multidrop and supporting three transmitters). The module can communicate with all transmitters simultaneously, and accordingly, can store ID information for them all.

As mentioned previously, when a new transmitter is added to the system, a field portable controller is used for the operator to key in an operator-specified device name for the transmitter. If several transmitters are to share a multidrop link, each transmitter must be added to the link and named one at a time so that each can be uniquely identified. After such a commissioning procedure, each transmitter, whether on a single or multidrop link, will contain in memory its device name.

Then at start-up of a field bus module system, the module creates a device name table in memory, as shown in FIG. 3, to store ID information for the transmitters it is connected to. The device name table 26 includes a first column 28 which designates a channel number for each of the current loops connected to the field bus module, and a second column 33 in which each device name is correlated to the corresponding channel number. This correlation sets up a scheme for keeping track of each hardwired transmitter and its ID information. When each transmitter is given a device name using the field portable controller, that name is automatically correlated with a corresponding channel number and stored in the device name table.

Any current loop in the multidrop configuration and including more than one transmitter is allotted a row in the device name column 33 for each of its transmitters (see channel 2 in the figure). In that way, the same channel number is correlated to each transmitter in the multidrop loop.

The bus module attempts to recover the ID information of each transmitter connected to each of the current loops following the procedure of FIG. 5 by sending the following command message to each transmitter:
Read Device ID via Device Name
REQUEST:
2C HEX (Standard protocol command byte corresponding to "read ID for this device name")
Device name (specify device name of interest)
CRC Least Significant Byte
CRC Most Significant Byte
If able to respond, a transmitter will reply as follows:
RESPONSE:
AC HEX (Standard protocol reply byte corresponding to "ID specified for a given device name")
Status byte (Indicate status of transmitter)
Device serial number (Part of ID number)
Device manufacture date (Part of ID number)
Device type (Part of ID number)
CRC Least Significant Byte
CRC Most Significant Byte After receiving this response, the field bus module correlates an ID to each of the device names in its device name table (FIG. 3) by storing each ID number in the corresponding row of an ID number column 35; it also generates the CRC value of each of the IDs and stores those in corresponding rows of a CRC value column 37. In this way, each current loop is automatically assigned a different channel number, and those transmitters sharing a current loop are groped together under the same channel number.

If any of the transmitters were unable to communicate with the module due to crosstalk or signal garbling, for example, the module initiates its command communications with the transmitter in the standard protocol. It also sets a flag in the corresponding row of a security flag column 39, thereby indicating that it was unable to determine the transmitter ID, and is thus restricted to using the standard protocol. If the factory process control system encounters a system fault (for example, a communications failure) the module will again query a transmitter for its ID once communications are reestablished, in case the transmitter is replaced or reinitialized during the fault. Thereafter, the module updates its device name table based on any changes in ID information it receives.

Standard Protocol Crosstalk Query

The control system supports a diagnostic procedure, called a crosstalk query, which uses the standard protocol. This query could be invoked by a field portable controller or a field bus module whenever a transmitter is commissioned to the network to determine if any unforeseen installation problems have created an opportunity for crosstalk between the old and new transmitter current loop links.

Figure 6:
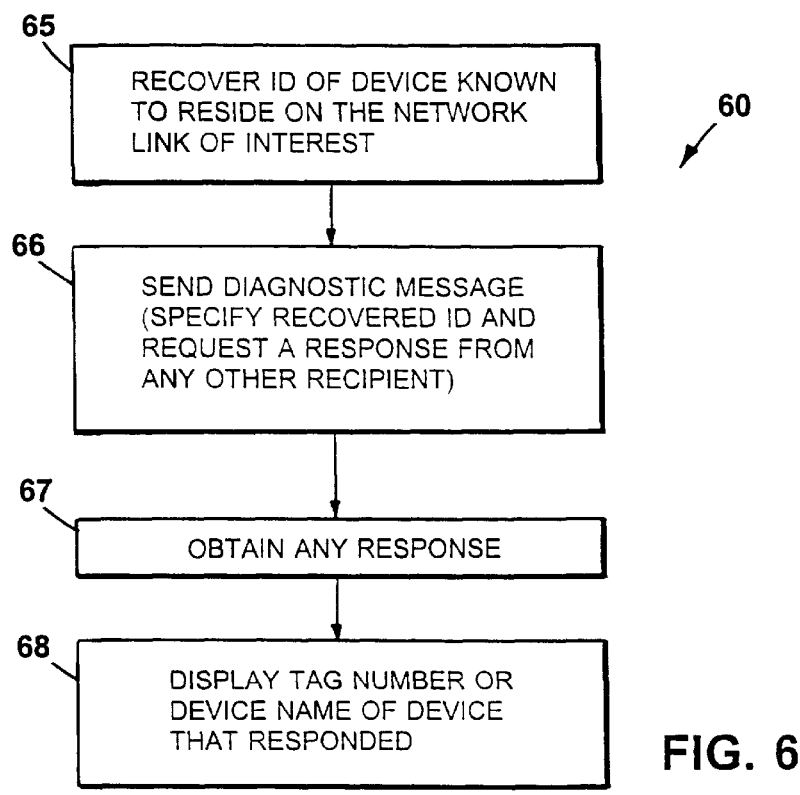
FIG. 6 is a flow chart illustrating the method of the invention for mapping crosstalk in a control system like that of FIG. 1.

Referring to FIG. 6, the crosstalk query procedure 60 is accomplished by a controller by first recovering 65 the ID number of the transmitter of interest, e.g., the transmitter which has been newly added to the system, following the ID recovery procedure described above. If the controller is unsuccessful in obtaining the ID of the transmitter of interest, the controller cannot proceed with the crosstalk query. If, however, the controller does successfully obtain the transmitter ID, it then sends 66 a message to the transmitter specifying the recovered ID number and requesting any transmitters other than the intended one that receive the message to respond to the controller. The requested response message is to contain either that transmitter's tag number or device name, depending on the configuration of the system, and may contain other information, such as the transmitter status. The following two standard protocol command-response sequences illustrate both types of requests, one for a field controller and one for a field bus module.

Crosstalk Tag Number Query—Field controller
REQUEST:
2A HEX (Command byte for crosstalk query)
Device serial number (Indicate ID of intended device)
Device manufacturing date (Part of ID)
Device type (Part of ID)
CRC Least Significant Byte
CRC Most Significant Byte
RESPONSE:
AA HEX (Header byte corresponding to receipt of a crosstalk query command)
status byte (Indicate transmitter status)
Tag number (Indicate tag number of transmitter receiving the crosstalk query)
CRC Least Significant Byte
CRC Most Significant Byte
Crosstalk Device Name Query—Field Bus Module
REQUEST:
2D HEX (Command byte for crosstalk query)
Device serial number (Indicate ID of intended device)
Device manufacturing date (Part of ID)
Device type (Part of ID)
CRC Least Significant Byte
CRC Most Significant Byte
RESPONSE:
AD HEX (Header byte corresponding to receipt of a crosstalk query command)
status byte (Indicate transmitter status)
Device Name (Indicate device name of the transmitter receiving the crosstalk query)
CRC Least Significant Byte
CRC Most Significant Byte Any reply responses obtained 67 by a controller in reply to the crosstalk query are processed by, e.g., displaying 68 the tag number or device name to the operator for analysis of any link crosstalking that occurred. This process allows the operator to quickly and efficiently determine if links of the system are "garbling" messages sent to a particular transmitter, and also provides an efficient "checkout" of a new transmitter and link, thereby detecting any marginal or faulty links.

Secure Protocol—Intermediate Level Security

As described above, the control system supports three levels of communications protocol; the standard protocol level was described above. The secure protocol variant is employed whenever a transmitter in a single loop or in a field bus module multidrop configuration is commanded and the transmitter ID has been obtained. The secure protocol may alternatively be specified for use at other times, e.g., when a transmitter in a single loop link is commanded in a more sensitive operation.

In the secure protocol variant, each controller command and transmitter response is protected by the inclusion of a so-called virtual ID in each message CRC field. That is, the CRC for each secure protocol command and response is generated as if the transmitter ID is included in the optional ID field of the message header, but the ID is not actually included in the field. This is accomplished in a computationally efficient manner by initializing, or preloading, the CRC bytes for the message with the CRC of the transmitter's ID string to thereby include the ID in the message CRC. Each transmitter that receives a secure protocol command generates an expected CRC for the message based on a CRC register preload of its own stored ID value, and processes the command only if the transmitted CRC matches the generated CRC. This procedure is described in more detail below.

The virtual ID scheme of the secure protocol level provides significant protection against inappropriate acceptance of a command by the wrong transmitter. Similarly, the probability that a crosstalking response would be accepted by a controller is reduced. Furthermore, this message security is provided without any increase in the message length or transmission time, and thus does not effect system throughput. This is particularly important for command sequences which have short, prespecified transmission times.

However, this protocol scheme is imperfect because it is possible, although not probable, for multiple transmitters' IDs to result in the generation of the same CRC value (i.e., while all the IDs are unique, their CRCs may not be unique), and thus cause multiple transmitters to act on the same commands. This may be prevented by checking the CRC of each transmitter's ID when that transmitter is commissioned into the system. If the newly added device has an ID which results in an existing CRC value, that device cannot be used in the system; the ID of each device is programmed at manufacture and cannot be changed. In this case, the system notifies the operator that the new device must be changed.

Critical Protocol—Highest Level Security

The critical protocol variant is used with any commands that modify the operating mode or data base of a transmitter. Each command and transmitter response communicated using the critical protocol variant includes the entire five byte-long transmitter's ID in the optional ID field of the message header. The CRC of the message is then, of course, based on the ID, just as in the secure protocol procedure. Because messages sent in the critical protocol include the transmitter ID, they are longer than those in the other protocol levels, and so consume more transmission time, thereby degrading the system throughput. Accordingly, the critical protocol is used only with commands of a critical nature having the ability to alter a transmitter mode; in this way the system throughput is optimized while the integrity of commands are protected.

Secure and Critical Protocol Implementation

Figure 7A:
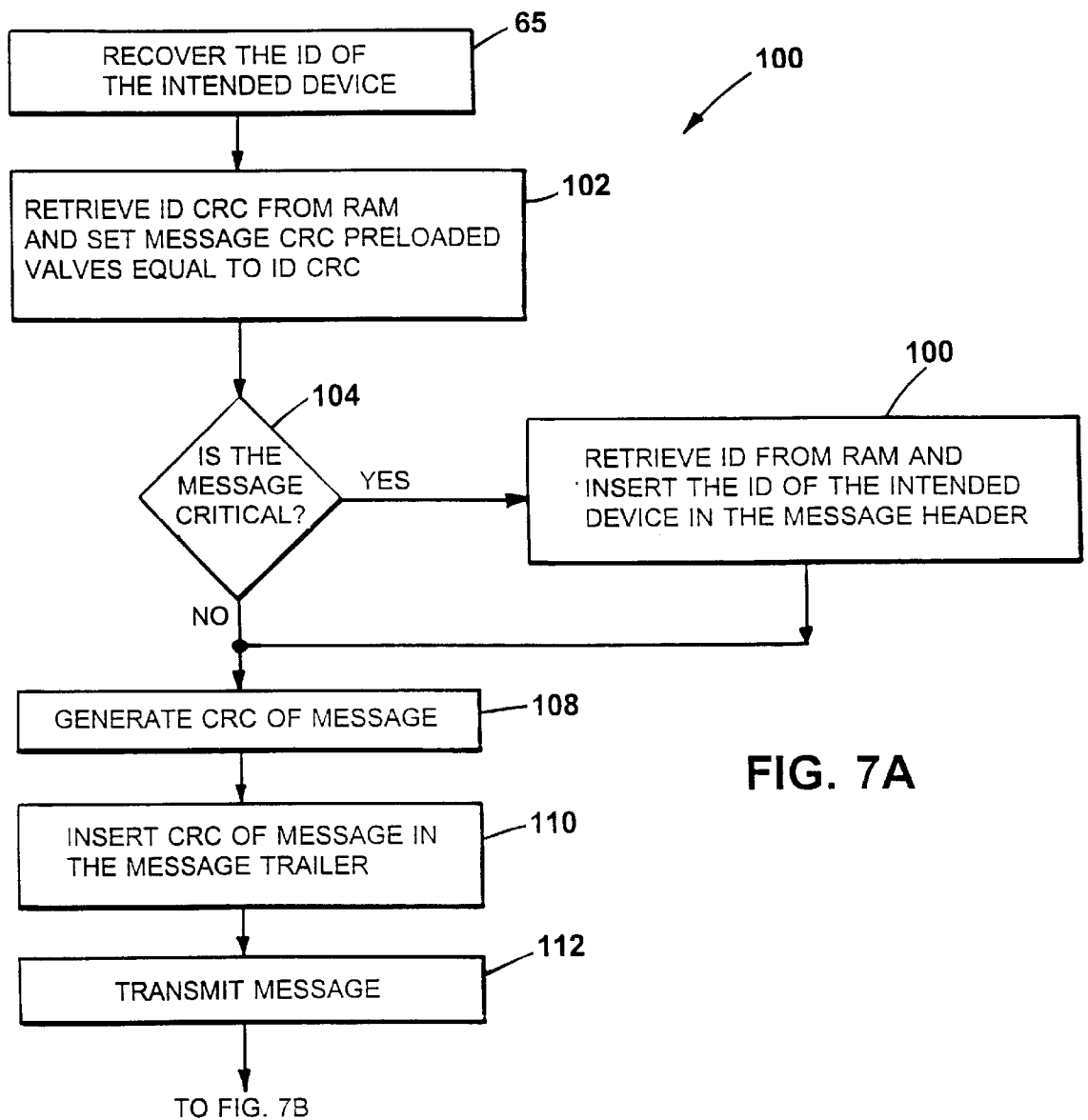
FIG. 7A is a flow chart illustrating the method of the invention for a controller to transmit a message to a transmitter in a control system like that of FIG. 1.

Referring to FIG. 7A, when using either the secure or critical level variants of the communications protocol, in either of the field bus module or field portable controller schemes, the controller and transmitter follow a security procedure 100. The controller first recovers 65 the ID of the intended transmitter, following the same standard protocol procedure discussed above with regard to the crosstalk query procedure. If the controller is unable to recover the transmitter's ID, the controller can communicate with the transmitter using only the standard protocol.

Given that the controller has recovered the transmitter's ID and stored the ID and its CRC in RAM (if a field controller), or the device name table (if a field bus module) then when initiating a command message in the secure or critical protocol, the controller retrieves 102 the ID CRC and preloads its sixteen bit-long CRC with the sixteen bit-long ID CRC, using the initialization step described above. Then, based on the availability of the transmitter ID and the command and response identifier table (FIG. 9), the controller determines 104 if the message protocol level is to be secure or critical. If the level is critical, the controller retrieves 106 the transmitter ID and inserts the ID in the ID field of the message header as the rest of the message is assembled. If the protocol level is not critical, the ID is not inserted, but the message CRC value remains preloaded with the ID CRC. In the message assembly process, the command hex code to be inserted in the header is selected from the identifier table and included in the message header.

Once the ID has been inserted in the assembled message's header field, if necessary, the message is ready for transmittal and the message CRC is generated 108 by the controller as the message is transmitted. At the completion of the calculation, the message CRC is inserted 110 in the trailer of the message and the end of the message is then transmitted 112.

Figure 7B:
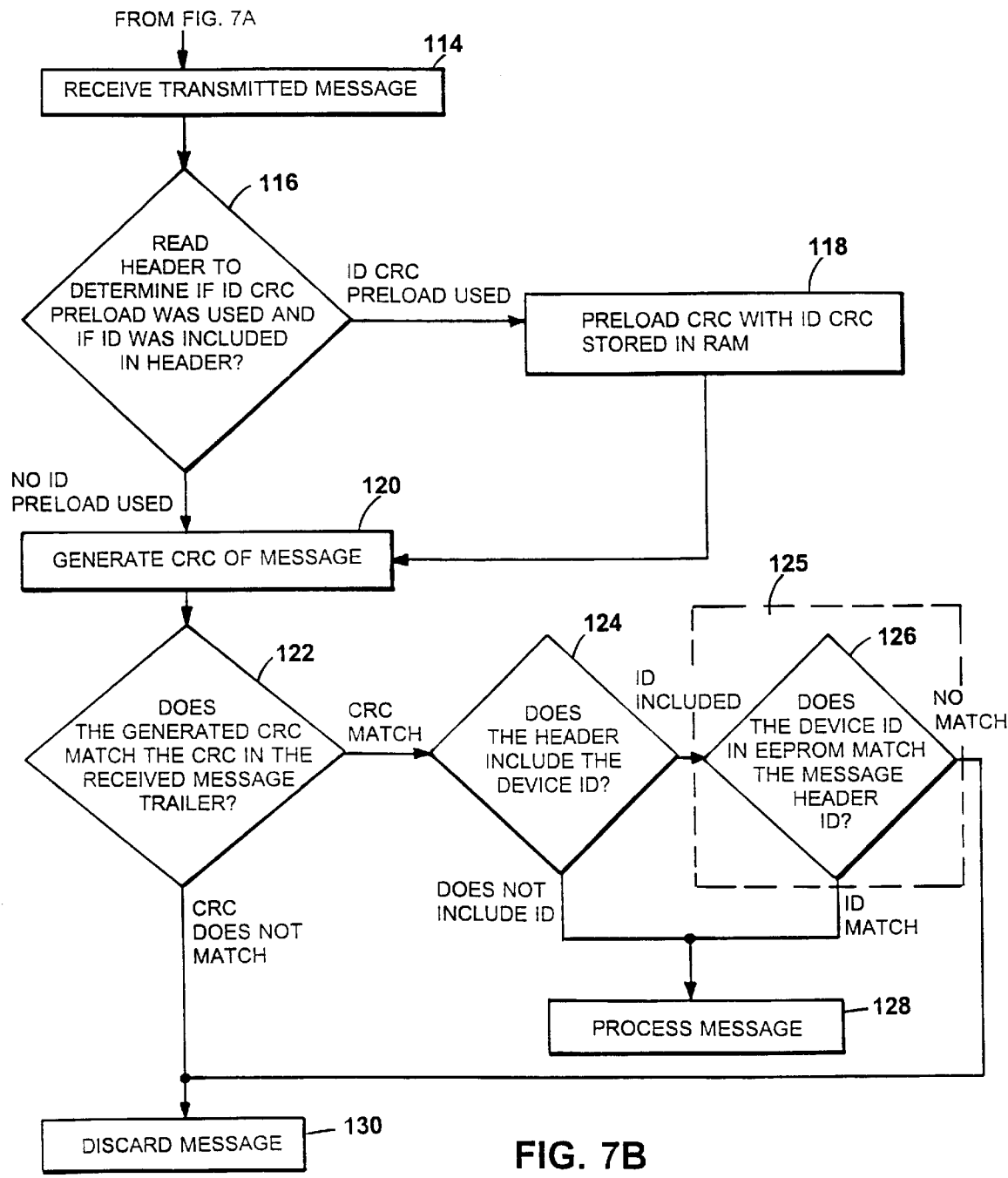
FIG. 7B is a flow chart illustrating the method of the invention for a transmitter to process a message transmitted by the method of FIG. 7A.

Referring also to FIG. 7B, following the security procedure of FIG. 7A, when a transmitter receives a message 114, it first checks 116 the command identifier in the header of the message to determine which of the three protocol levels was used by the controller. The command code is correlated in the transmitter's identifier table to a command and protocol level, as described above; if the header command indicates that one of the secure or critical protocols was used, the transmitter then preloads 118 its message CRC value with its own ID CRC from its RAM.

If the command code indicates that the standard protocol was used, the ID CRC value generated by the transmitter is preloaded to the value "0" in the standard protocol procedure described previously. Then, based on the current preload, the transmitter generates 120 the CRC for the received message. This generated value is compared 122 to the CRC value in the trailer of the message; if the two CRC values do not match, the message is discarded 130.

Alternatively, if the two CRC values do match, the transmitter next rechecks 124 the message header to determine if the message header includes the five byte-long ID value. If the ID is not included in the header, the transmitter automatically processes 128 the message. However, if the ID is included in the header, the transmitter does a critical protocol check 125 and compares 126 its own ID stored in EEPROM with that in the message header. If the two ID values match, the transmitter processes 128 the message, while a disagreement between the ID values causes the transmitter to discard 130 the message.

Figure 8A:
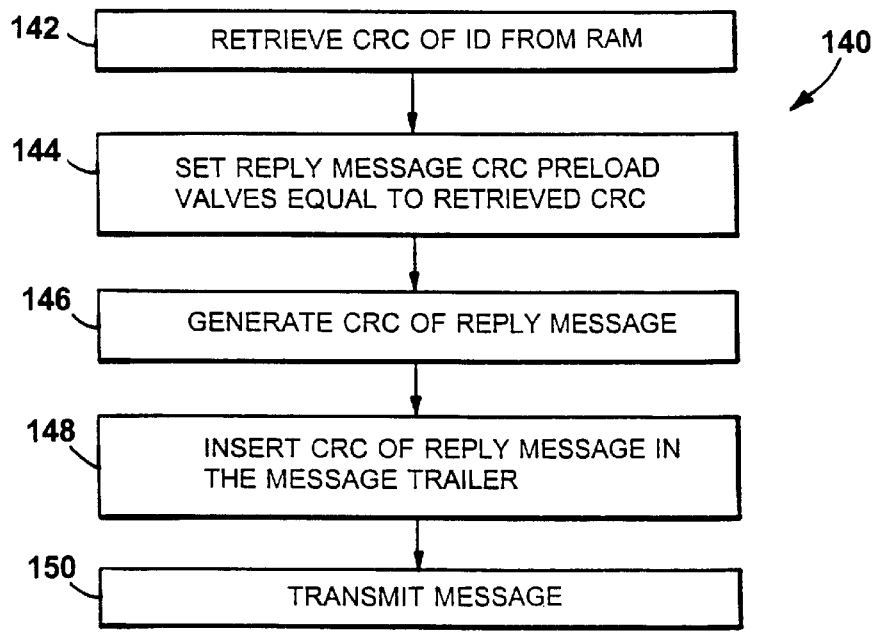
FIG. 8A is a flow chart illustrating the method of the invention for a transmitter to transmit a response message to a controller in a control system like that of FIG. 1.

Referring to FIG. 8A, the response procedure 140 followed by a transmitter when it responds to a secure or critical command is the same for both of these protocol levels. In neither case is the transmitter's ID sent in the response message's optional ID field, thereby minimizing message length and transmission time. Following the response procedure 140, the transmitter first retrieves 142 its ID CRC stored in RAM and sets 144 its CRC preload values equal to the retrieved CRC values. Then, the response message is assembled based on the command and the protocol used; for example, each protocol level has a corresponding response code which must be appropriately selected. After assembling the response, the transmitter generates 146 the CRC of the response, based on the ID CRC preload values. The generated message CRC is then inserted 148 in the trailer of the message, and the message is transmitted 150.

Figure 8B:
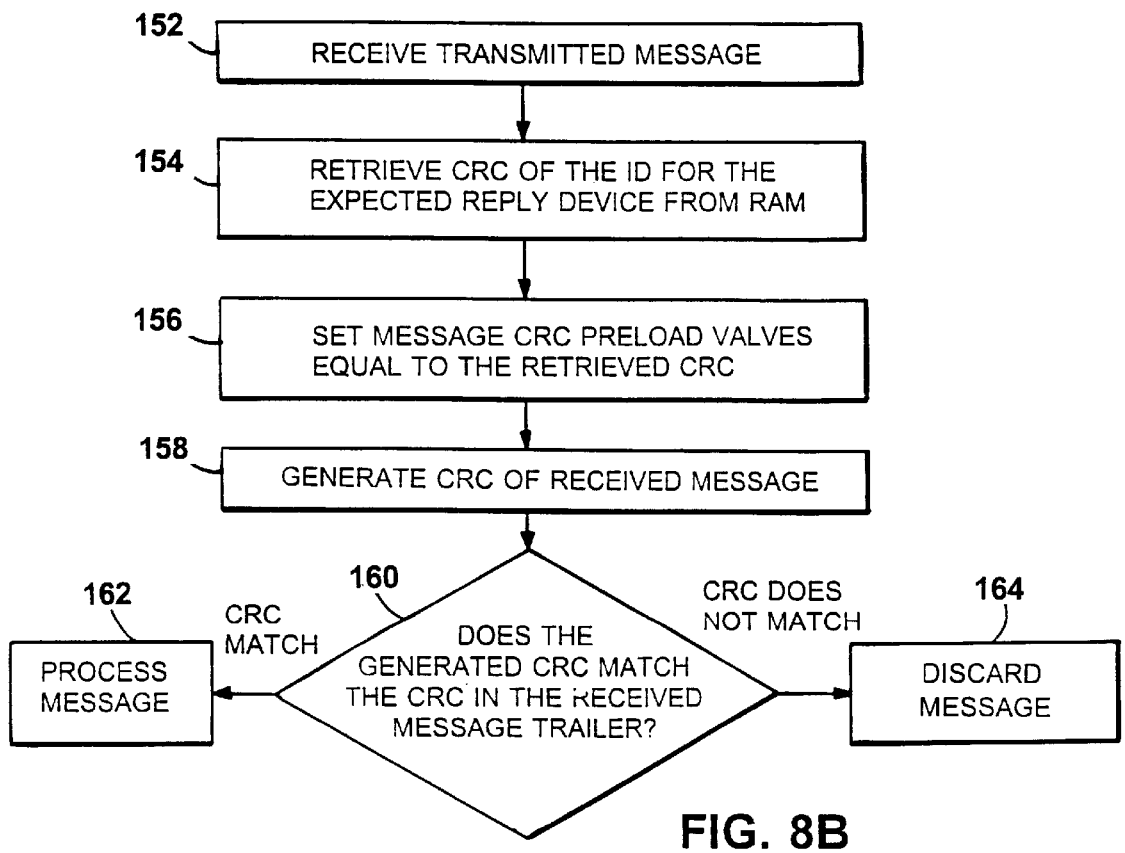
FIG. 8B is a flow chart illustrating the method of the invention for a controller to process a message transmitted by the method of FIG. 8A.

Also referring to FIG. 8B, upon receipt 152 of the transmitted response, the controller retrieves 154 from its RAM the CRC of the ID for the transmitter expected to respond, and sets 156 the CRC value equal to the retrieved ID CRC. The transmitter then generates 158 the CRC of the received message, and compares 160 this value with the CRC in the trailer of the received message. If the two CRC values match, the controller processes 162 the response, while the controller discards 164 the message if the two values do not match.

The following two command-response sequences illustrate the secure protocol variant of the "Read device status" and "Reinitialize" standard protocol sequences given above.

Secure Protocol Read Device Status

REQUEST:

24 HEX (Secure protocol command byte corresponding to "read device status")

CRC w/CRC-ID preload Least Significant Byte

CRC w/CRC-ID preload Most Significant Byte

RESPONSE:

A4 HEX (Secure protocol reply byte corresponding to "device status")

Status byte (Indicate status of transmitter)

Status byte (Indicate status of transmitter)

CRC w/CRC-ID preload Least Significant Byte

CRC w/CRC-ID preload Most Significant Byte

The following command-response sequence illustrates the critical protocol variant of a "Reinitialize" command:

Critical Protocol Reinitialize

REQUEST:

60 HEX (Critical protocol command byte corresponding to "reinitialize transmitter status")

Device serial number (Part of ID number)

Device manufacture date (Part of ID number)

Device type (Part of ID number)

CRC w/CRC-ID preload Least Significant Byte

CRC w/CRC-ID preload Most Significant Byte

RESPONSE:

E0 HEX (Critical protocol reply byte to "reinitialize")

Status byte (Indicate status of transmitter)

FE HEX (Critical protocol reply for indicating reinitialization)

CRC w/CRC-ID preload Least Significant Byte

CRC w/CRC-ID preload Most Significant Byte

An example of code that implements the three levels of communications protocol and the crosstalk query procedure is set forth in Appendix A as microfiche. The portable controller code in Appendix A is written in PSION OPL language; the field bus module code is written in INTEL 8344 assembly language; and the actuator code is written in Motorola 68HC11 assembly language. Appendix A is subject to copyright protection. The copyright owner has no objection to the reproduction of Appendix A as it appears in the United States Patent and Trademark office, but otherwise reserves all copyright right whatsoever.

The communications protocol of the invention provides many advantages. The virtual ID scheme of the secure protocol level provides significant protection against inappropriate acceptance of a command by the wrong transmitter. Similarly, the probability that a crosstalking response would be accepted by a controller is reduced. Furthermore, this message security is provided without any increase in the message length or transmission time, and thus does not effect system throughput. This is particularly important for command sequences which have short, prespecified transmission times. The critical protocol is used only with commands of a critical nature having the ability to modify a transmitter operational mode or data base; in this way the system throughput is optimized while the integrity of commands are protected. The use of an adaptable identifier table provides a scheme for embedding a protocol level indication within a command code itself, thereby requiring processing of only the actual command to determine the protocol of a received message. It further provides the ability to modify the protocol levels available for various commands and responses; the table could be updated based on changes in the factory process or changes in the criticality of various monitoring functions.

Other embodiments of the security protocol are within the scope of the claims. For example, the controller may comprise a stationary central controller, a group of distributed stationary controllers, or a remote controller accessed via, e.g., radio communications, rather than hardwired links. The checksum included in the command and response messages may consist of an arithmetic checksum, or any other convenient and effective checksum. Appropriate hardware implementation of the CRC checksum generation procedure may replace the software implementation.

Other embodiments are within the following claims.

What is claimed is:

1. A method for indicating an intended recipient device of a command message transmitted by a communications controller in a factory process control system comprising a plurality of devices linked together and each linked to the communications controller for command by the controller, each device being adapted for a sensing or actuating function related to the factory process and having an associated identification number which is unique to the device, the method comprising the steps of:

selecting a command code identifying a desired action to be taken by the intended recipient device, generating a command checksum from said command code and from said identification number of the intended recipient device, constructing a command message including said command code and said command checksum, said command message excluding said identification number, and transmitting said command message from said communications controller.

2. The method of claim 1 further comprising the steps of:

receiving said command message at one of said plurality of linked devices, generating a second command checksum from said transmitted command code and from said identification number of said one linked device receiving said command message, comparing said second command checksum with said command checksum transmitted with said command message, and accepting said transmitted command message only if said command checksum included in said transmitted command message matches said second command checksum, whereby said command message is accepted only by an intended device.

3. The method of claim 2 further comprising the steps of:

said intended recipient device transmitting a reply to said communications controller, by compiling said reply, generating a reply checksum from said reply and from said identification number of said intended recipient device, constructing a reply message including said reply and said reply checksum, said command message excluding said identification number, and transmitting said reply message from said intended recipient device.

4. The method of claim 2 wherein said command checksum and said second command checksum comprise cyclic redundancy codes.

5. The method of claim 2 further comprising the steps of:

before said command checksum generation, generating an ID checksum from said identification number of said intended recipient device, and wherein said step of generating a command checksum comprises using said ID checksum as an initialization value for said command checksum, and after said command message receipt at said one linked device, generating a recipient ID checksum from said identification number of said one linked device, and wherein said step of generating a second command checksum comprises using said recipient ID checksum as an initialization value for said second command checksum.

6. The method of claim 5 wherein said ID checksum, said command checksum, said recipient ID checksum, and said second command checksum all comprise cyclic redundancy codes.

7. The method of claim 5 further comprising, before generating said ID checksum, a first step of sending a query message from said communications controller to said intended recipient device requesting said intended recipient device to transmit a message to said communications controller indicating the identification number of said intended recipient device for subsequent use by said communications controller in generating said ID checksum.

8. The method of claim 7 further comprising the steps of:

said intended recipient device transmitting said message to said communications controller indicating said identification number of said intended recipient device, and said intended recipient device generating a recipient ID checksum from said identification number and storing said recipient ID checksum for subsequent use in generating said second command checksum.

9. The method of claim 2 further comprising the steps of:

determining if said command message comprises a critical command before transmitting said command message from said communications controller, and including said identification number for said intended recipient device in said transmitted command message if said command message comprises a critical command.

10. The method of claim 9 wherein said critical command comprises a command to modify an operating mode or data base of said intended recipient device.

11. A method for transmitting messages between a communications controller and devices in a factory process control system, the factory process control system comprising a plurality of devices linked together and each linked to the communications controller for command by the communications controller, each device being adapted for a sensing or actuating function related to the factory process and having an associated identification number which is unique to the device, the method comprising the steps of:

compiling a message to be transmitted, based on a degree of criticality of said message, invoking one of a plurality of available message protocols, each message protocol being defined to generate a message checksum for the message in a manner different from the other message protocols, including said checksum in said message, and transmitting said message.

12. The method of claim 11 wherein said plurality of message protocols comprises a standard protocol for use with noncritical messages and defined to generate a message checksum from said message, and a secure protocol for use with more critical messages and defined to generate a message checksum from said message and the identification number of a device for which the message is intended.

13. The method of claim 12 wherein said plurality of message protocols further comprises a critical protocol for use with most critical messages and defined to generate a message checksum from said message and the identification number of a device for which the message is intended, and further including the step of including said identification number in said transmitted message if said critical protocol is invoked.

14. The method of claim 13 wherein said message checksum comprises a cyclic redundancy code.

15. The method of claim 11 wherein said plurality of message protocols comprises a standard protocol for use with noncritical messages and defined to generate a message checksum from said message, and a critical protocol for use with more critical messages and defined to generate a message checksum from said message and the identification number of a device for which the message is intended, and further including the step of including said identification number in said transmitted message if said critical protocol is invoked.

16. The method of claim 11 wherein said plurality of message protocols comprises a secure protocol defined to generate a message checksum from said message and the identification number of a device for which the message is intended, and a critical protocol for use with more critical messages and defined to generate a message checksum from said message and the identification number of a device for which the message is intended, and further including the step of including said identification number in said transmitted message if said critical protocol is invoked.

* * * * *